United States Patent

Torigaki

[11] Patent Number: 5,431,476
[45] Date of Patent: Jul. 11, 1995

[54] VEHICLE BODY CONSTRUCTION

[75] Inventor: Toshikazu Torigaki, Yokosuka, Japan

[73] Assignee: Nissan Motor Co., Ltd., Yokohama, Japan

[21] Appl. No.: 332,624

[22] Filed: Oct. 31, 1994

Related U.S. Application Data

[63] Continuation of Ser. No. 132,260, Oct. 6, 1993, abandoned.

[30] Foreign Application Priority Data

Oct. 30, 1992 [JP] Japan .................................. 4-292289

[51] Int. Cl.⁶ .............................................. B60J 5/04
[52] U.S. Cl. .................................... 296/188; 296/189; 296/202; 296/146.6; 49/502
[58] Field of Search .................... 132/260; 296/146.5, 296/146.6, 188, 189, 202; 49/502, 503, 9

[56] References Cited

U.S. PATENT DOCUMENTS

| 3,887,227 | 6/1975 | Deckort | 296/188 |
| 4,307,911 | 12/1981 | Pavik | 296/146.6 X |
| 4,915,442 | 4/1990 | Garnweidner | 296/146.6 X |

FOREIGN PATENT DOCUMENTS

| 2257449 | 7/1975 | France | 49/502 |
| 2006498 | 9/1971 | Germany . | |
| 3703021 | 8/1988 | Germany | 296/188 |

Primary Examiner—Dennis H. Pedder
Attorney, Agent, or Firm—Lowe, Price, LeBlanc & Becker

[57] ABSTRACT

A motor vehicle has first and second flexible members disposed within front and rear doors in the longitudinal direction relative to the vehicle. First ends of each of the flexible members are coupled together through a coupling member which ensures coupling when the doors are closed. Respective other ends of the two flexible members are each coupled with respective lower portions of the vehicle body frame.

16 Claims, 14 Drawing Sheets

VEHICLE BODY CONSTRUCTION

This is a continuation of application Ser. No. 132,260 filed Oct. 6, 1993 now abandoned.

FIELD OF THE INVENTION

The present invention relates generally to a vehicle body and more particularly, to the vehicle body in connection with reinforcement of doors.

BACKGROUND OF THE RELATED ART

Referring to FIGS. 24 and 25, one of conventional vehicle bodies is disclosed, for example, in DE 2,006,498. FIG. 24 shows a four-door motor vehicle having front doors 1 and rear doors 3 which allow opening/closing of the sides of a vehicle body thereof. The doors 1, 3 are reinforced by tension of wires 5, 7 as long flexible members which are disposed therein in the longitudinal direction of the vehicle body.

Referring also to FIG. 25, the wire 5 of each front door 1 has one end connected to a front pillar 17 through a coupling member 25, and another end connected to the front door 1 at the rear portion thereof through a stationary bracket 26. The stationary bracket 26 has an end protruding from the door 1 and connected to a hook 27. The wire 7 of each rear door 3 has one end connected to the hook 27, and another end connected to the rear door 3 through a stationary bracket 29 which is in turn removably connected to a hook 30 of a rear pillar 21.

Connection of the stationary bracket 26 to the hook 27 is such as to ensure engagement of the wires 5, 7 in the direction of extending thereof, and easy disengagement of the wires 5, 7 by opening/closing action of the front door 1 on the front pillar 17 as a hinge center.

When a collision load is input, for example, to the front door 1 due to side collision or the like, the wire 5 has tension produced by deformation of the front door 1. This tension of the wire 5 is transmitted mainly to the front pillar 17 through the coupling member 25 on one hand, and to a center pillar 28 through the stationary bracket 26, hook 27, rear door 3, and a hinge member (not shown) for supporting the rear door 3 to the center pillar 28 on the other hand. Therefore, tension of the wire 5 which is firmly supported by the front pillar 17, center pillar 28, etc. enables absorption of collision energy, and thus restraint of inward deformation of the door 1 as viewed in the cross direction of the vehicle body.

With such known construction that all constituents of tension produced in the wire 5 operate on the center pillar 28, hinge member of the rear door 3, etc., however, not only the center pillar 28 needs a considerable reinforcement, but the hinge member should be increased in size, resulting in a possibility of a great increase in weight.

It is, therefore, an object of the present invention to provide a vehicle body which enables absorption of collision energy, and thus restraint of deformation of a door without any increase in weight.

SUMMARY OF THE INVENTION

According to the present invention, there is provided a vehicle body construction for a motor vehicle having a longitudinal direction, comprising:
a body frame including a front pillar, a rear pillar, a center pillar disposed forwardly of said rear pillar and rearwardly of said front pillar with respect to the longitudinal direction of the motor vehicle, said body frame also including a side sill between said front, center and rear pillars;
a front door hingedly connected to said front pillar;
a rear door hingedly connected to said center pillar;
a first coupling member fixed to said front door at a portion which comes adjacent to said center pillar when said front door is closed;
a second coupling member fixed to said front pillar;
a third coupling member fixed to said rear pillar;
said front door having a first member which has one end portion fixedly coupled with said first coupling member and the opposite end portion;
said rear door having a second member which has one end portion mating with said third coupling member for coupling therewith during closing of said rear door with said front door closed, and the opposite end portion;
means for supporting said first member on said front pillar for allowing limited movement of said first member in a direction toward said second coupling member and for movement with said front door such that the opposite end portion of said first member is coupled with said second coupling member during closing of said front door;
means for supporting said second member on said center pillar for allowing limited movement of said second member in a direction toward said first coupling member and for movement with said rear door such that the opposite end portion of said second member is coupled with said first coupling member during closing of said rear door with said front door closed.

DETAILED DESCRIPTION OF THE PREFERRED EMBODIMENTS

Figure 1:
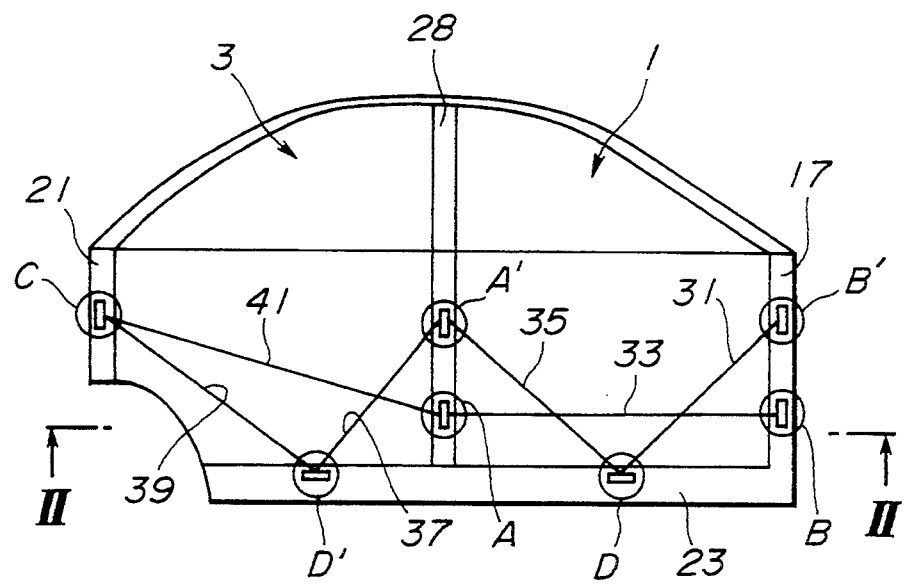
FIG. 1 is a schematic side view showing a vehicle body construction of a four-door motor vehicle to which the present invention is applied.

Referring to the drawings wherein like reference numerals designate like parts throughout the views, preferred embodiments of the present invention will be described.

FIG. 1 schematically shows a side of a four-door motor vehicle to which the present invention is applied, with a front door 1 and a rear door 3, and wires 31, 33, 35, 39, 41 as long flexible members arranged therein. Each of the wires 31, 33, 35, 39, 41 is composed of a single unstranded wire member, however, it may be composed of a stranded wire member.

The wire 33 as a first long flexible member is connected to a center pillar 28 as a vehicle body frame member and the wire 41 as a second long flexible member in a portion A, and it is also connected to a front pillar 17 as a vehicle body frame member in a portion B. The wire 31 is connected to the front pillar 17 in a portion B', and to a side sill 23 in a portion D. The wire 35 is connected to the center pillar 28 and the wire 37 in a portion A', and to the side sill 23 in the portion D. The wire 41 is connected to the center pillar 28 and the wire 33 in the portion A, and to a rear pillar 21 as a vehicle body frame member in a portion C. The wire 37 is connected to the center pillar 28 and the wire 35, and to the side sill 23 in a portion D'. The wire 39 is connected to the rear pillar 21 in the portion C, and to the side sill 23 in the portion D'. Such arrangement of the wires 31, 33, 37, 39, 41 ensures, upon side collision, reinforcement of the front door 1 and the rear door 3, principally in the position thereof corresponding to a bumper of another motor vehicle.

It is to be noted that the coupling structures of the portions A', B', C', and D' are substantially the same as those of the portion A, B, C, and D, respectively. Therefore, a description will be made with regard to only the coupling structures of the portions A, B, C, and D.

Figure 2:
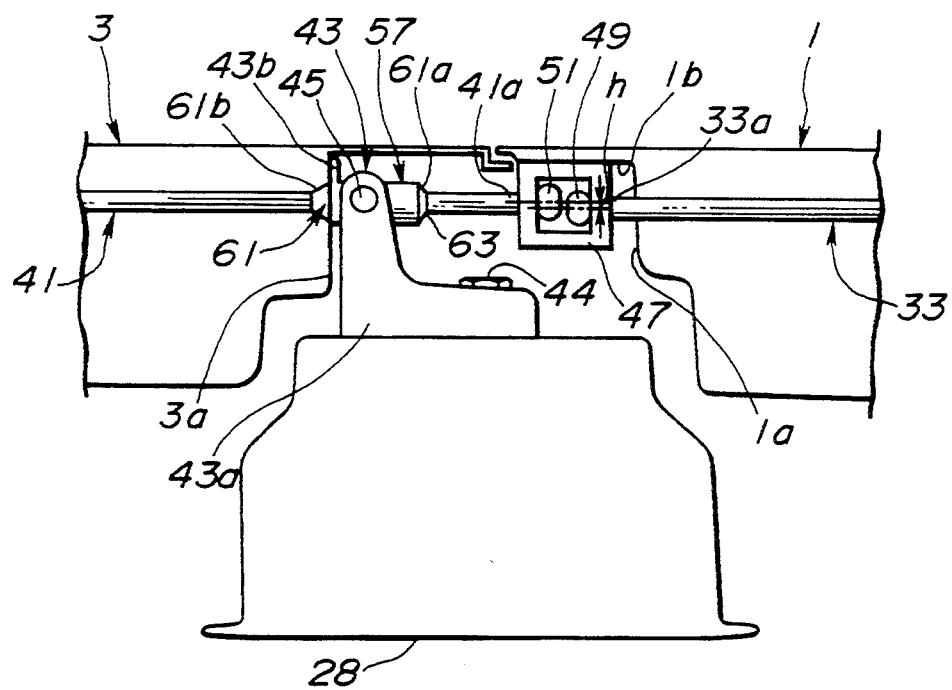
FIG. 2 is a schematic longitudinal section taken along the line II—II of FIG. 1, illustrating a first preferred embodiment of the present invention and showing a portion A in FIG. 1.

Referring to FIG. 2, there is shown a first preferred embodiment of the present invention. FIG. 2 is a longitudinal section taken along the line II—II in FIG. 1, illustrating the center pillar 28 and a periphery thereof. It is to be noted that FIG. 2 is a schematic sectional view, and that actually the front door 1, rear door 3, center pillar 28, etc. have a predetermined thickness, respectively, and a weather strip for sealing, etc. are interposed between the doors 1. 3 and the center pillar 28.

Referring to FIG. 2, the rear door 3 is rotatably supported through a hinge member 43 so as to allow opening/closing of the side of a vehicle body. The hinge member 43 includes a pillar side hinge 43a secured to the center pillar 28 by a bolt and nut 44, and a door side hinge 43b secured to the rear door 3 at a front end 33b 3a thereof, which are coupled with each other by a hinge pin 45. As will be described later, the front door 1 is connected to the front pillar 17 as shown in FIG. 1 through a hinge member.

A coupling member 47 as a coupling part is disposed between the doors 1, 3. The coupling member 47 is constructed to couple ends of the wires 33, 41 as the first and second long flexible members to each other in such a manner as to be able to transmit tension, and interrupt coupling thereof in accordance with rotation of the doors 1, 3.

Specifically, the coupling member 47 is in the shape of a box, and fixed by welding or the like to the front door 1 at a rear end 1a thereof and on a surface 1b thereof on the inner side as viewed in the cross direction of the vehicle body. A first head 49 is arranged to the wire 33 at a rear end thereof protruding from the rear end 1a of the front door 1, whereas a second head 51 is arranged to the wire 41 at a front end 33b thereof protruding from the front end 3a of the rear door 3. The heads 49, 51 of the wires 33, 41 are engaged with the coupling member 47, obtaining connection of the wires 33, 41.

Figure 3:
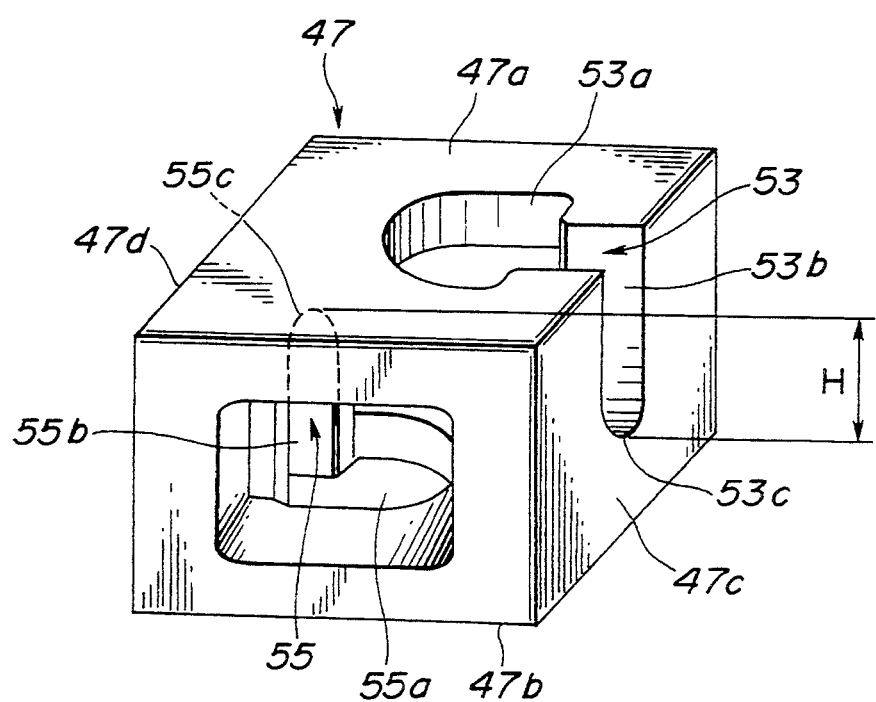
FIG. 3 is a perspective view showing a coupling member.

FIG. 3 is a perspective view showing the coupling member 47. The coupling member 47 is in the shape of a rectangular box, and has in the cross direction of the vehicle body side walls 47a, 47b formed with grooves 53, 55.

The groove 53 formed in one side wall 47a serves to receive the rear end of the wire 33 having the first head 49.

The groove 55 formed in the other side wall 47b serves to release and receive the end of the wire 41 having the second head 51 in accordance with opening/closing of the doors 1, 3. The grooves 53, 55 have the same shape, and are arranged symmetrically.

The groove 53 has an enlarged bore portion 53a formed in the side wall 47a on the outer side as viewed in the cross direction of the vehicle body, and a long groove portion 53b formed in a front wall 47c. The groove 55 has the same shape as that of the groove 53, and has an enlarged bore portion 55a formed in the side wall 47b on the inner side as viewed in the cross direction of the vehicle body, and a long groove portion 55b formed in a rear wall 47d. A distance is established between inner parts 53c, 55c of the long groove portions 53b, 55b, the inner part 53c being located on the relatively inner side as viewed in the cross direction of the vehicle body, whereas the inner part 55c being located on the relatively outer side as viewed in the cross direction of the vehicle body.

The first head 49 of the wire 33 on the side of the front door 1 as shown in FIG. 2 is inserted into the groove 53 of the coupling member 47 through the enlarged bore portion 53a as shown in FIG. 3, and the wire 33 is positioned in the position where it abuts on the inner part 53c of the long groove portion 53b. In this state, the surface or side wall 47a of the coupling member 47 on the outer side as viewed in the cross direction of the vehicle body is fixed by welding or the like to the surface 1b of the front door 1 at the rear end 1a and on the inner side as viewed in the cross direction of the vehicle body. Positioning of the wire 33 in the inner part 53c of the long groove portion 53b can be carried out by welding or bonding. Alternatively, positioning of the wire 33 in the inner part 53c of the long groove portion 53b can be carried out by forcedly putting the wire 33 through a slightly narrowly formed part of the long groove portion 53b.

On the other hand, the second head 51 of the wire 41 as shown in FIG. 2 is inserted into the coupling member 47 through the enlarged bore portion 55a as shown in FIG. 3, and the wire 41 itself is located in the inner part 55c of the long groove portion 55b, and set as shown in FIG. 2.

Referring to FIG. 2, in this state, the wire 33 is set on the inner side as viewed in the cross, i.e., transverse, direction of the vehicle body, whereas the wire 41 is set on the outer side as viewed in the cross direction of the vehicle body, a positional difference "h" being established between center axes of the wires 33, 41. Therefore, the coupling position of the end of the long flexible member on the side of the front door 1 with the coupling member 47 is on the inner side as viewed in the cross direction of the vehicle body, whereas the coupling position of the end of the long flexible member on the side of the rear door 3 with the coupling member 47 is on the outer side as viewed in the cross direction of the vehicle body.

The hinge member 43 has an engagement portion 57 as a support part. The engagement portion 57 is arranged on the side of the center pillar 28 as a vehicle body frame member for supporting the rear door 3, and constructed to support the wire 41 as a long flexible member, and allow transmission of tension between the wires 33, 41 in the direction of extending thereof.

Figure 4:
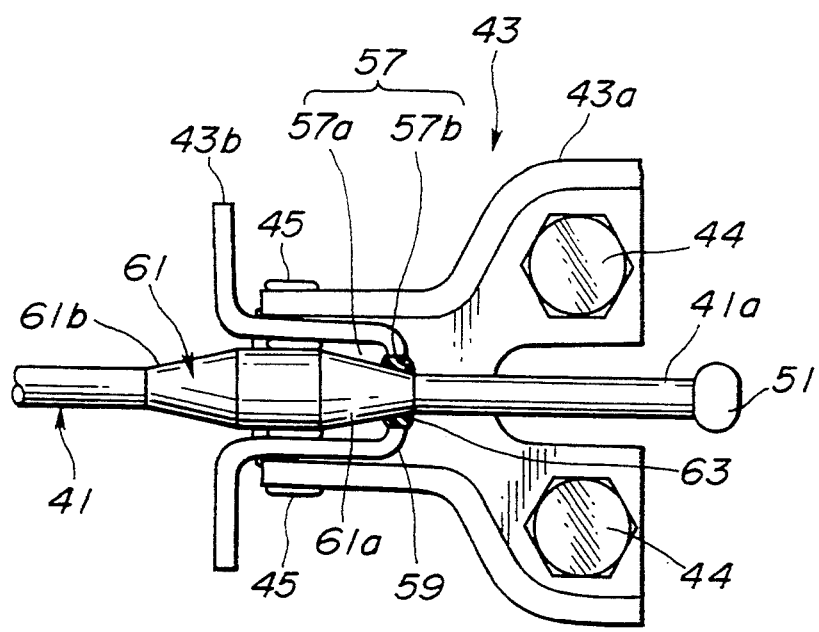
FIG. 4 is a side view showing a hinge member.
Figure 5:
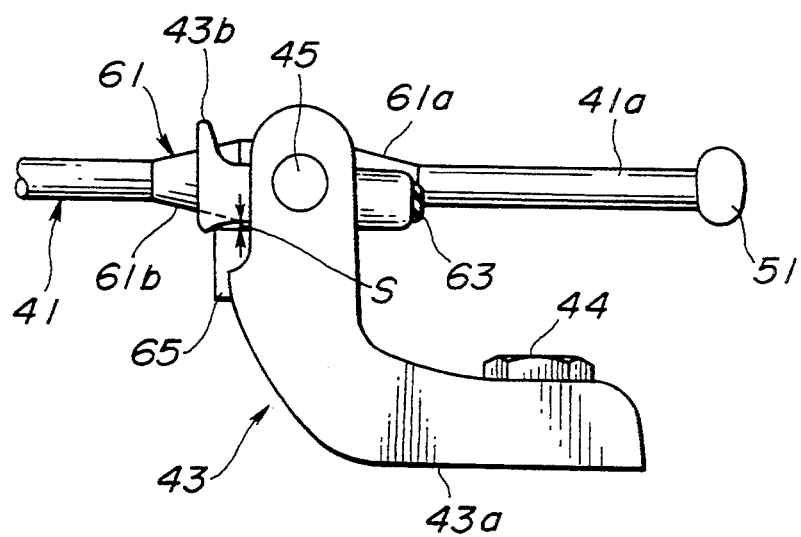
FIG. 5 is a plan view showing the hinge member.

Specifically, referring to FIGS. 4 and 5, the hinge member 43 comprises the pillar side hinge 43a and the door side hinge 43b which are rotatably connected to each other by the hinge pin 45 having two divided portions. The door side hinge 43b has a space 57a on the inside thereof for receiving the wire 41, and a recess 57b in a longitudinal wall 59 thereof. The space 57a and the recess 57b constitute the above engagement portion 57. The engagement portion 57 is constructed to transmit to the center pillar 28 as a vehicle body frame member for supporting the rear door 3 constituents of tension of the wire 41 as a long flexible member operating in the cross direction of the vehicle body and in the vertical direction, and not constituents operating in the direction of extending of the wire 41.

Referring particularly to FIG. 4, a tubular cover member 61 is engaged with and fixed to the wire 41, which is protected by the engagement portion 57. The cover member 61 has both ends having tapers 61a, 61b, respectively.

One end of the cover member 61 is positioned in the recess 57b by a resilient member 63 such as rubber or the like.

Referring to FIG. 5, reference numeral 65 designates a hinge cap, and S designates a clearance between the hinge cap 65 and the cover member 61.

Figure 6:
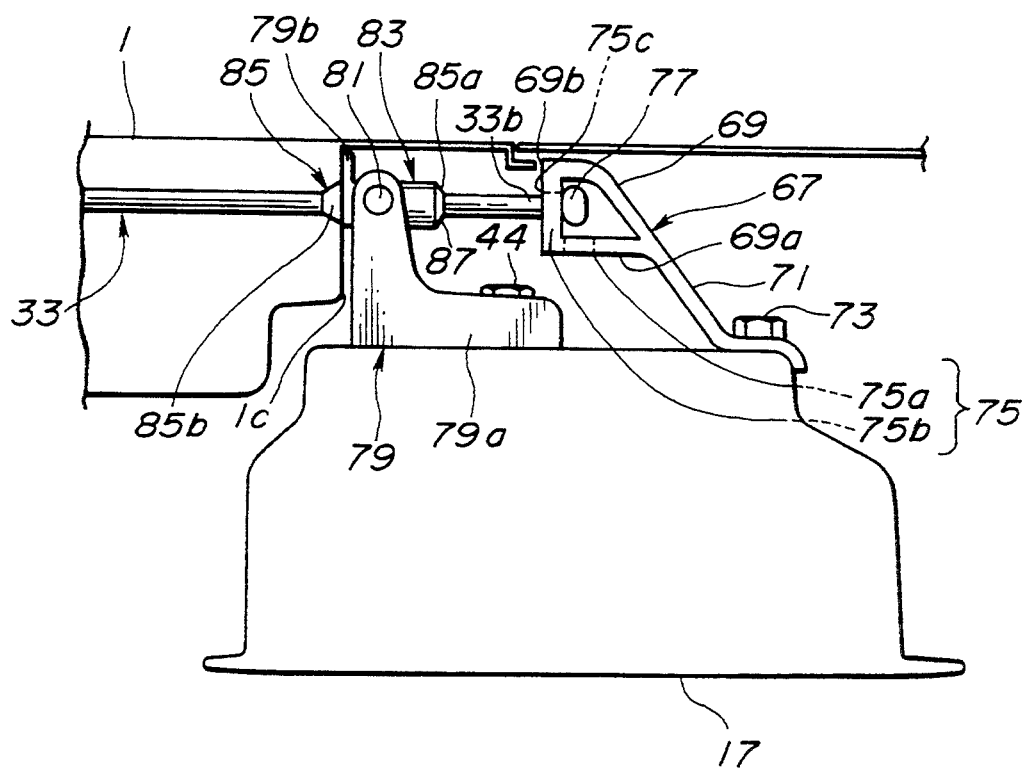
FIG. 6 is a view similar to FIG. 2, showing a portion B in FIG. 1.
Figure 7:
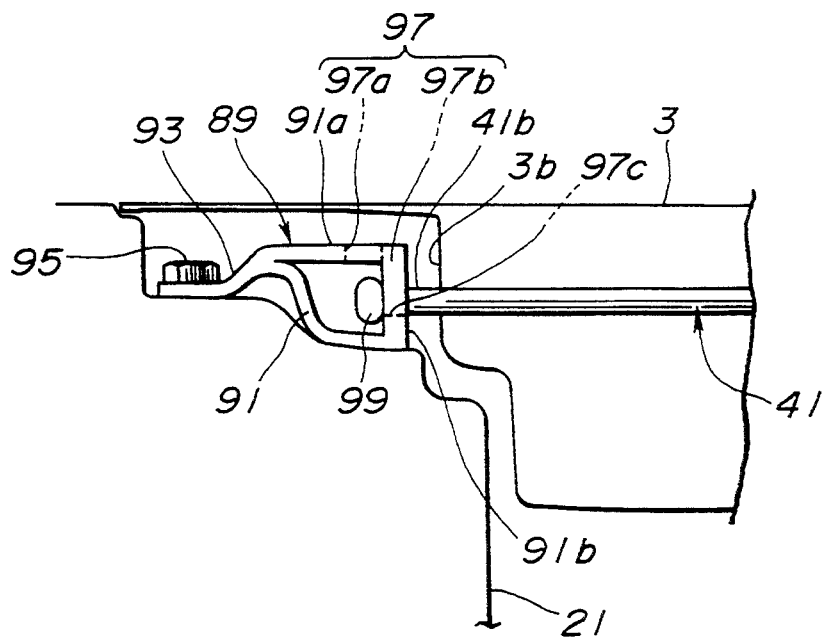
FIG. 7 is a view similar to FIG. 6, showing a portion C in FIG. 1.
Figure 8:
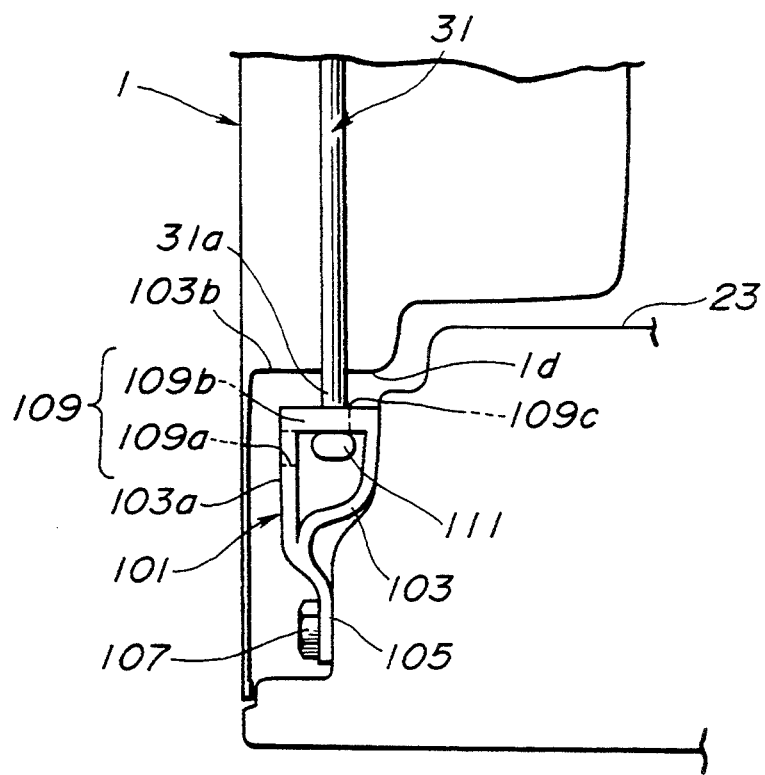
FIG. 8 is a view similar to FIG. 7, showing a portion D in FIG. 1.

FIGS. 6 to 8 show a state of coupling of the wires in the portions B, C, D as shown in FIG. 1, respectively.

FIG. 6 is a schematic section illustrating the wire 33 coupled in the portion B as shown in FIG. 1. A front end 33b of the wire 33 protruding from the front end 1c of the front door 1 is connected to the front pillar 17 by a coupling member 67. The coupling member 67 comprises a box portion 69 and a leg portion 71. The leg portion 71 is fixed to the front pillar 17 by a bolt and nut 73. The box portion 69 is in substantially the same shape as that of the coupling member 47 as shown in FIG. 3, and formed with a groove 75 having an enlarged bore portion 75a formed in a side wall 69a on the inner side as viewed in the cross direction of the vehicle body, and a long groove portion 75b formed in a side wall 69b on the rear side as viewed in the longitudinal direction of the vehicle body. Arranged at the front end 33b of the wire 33 is a third head 77 which is inserted into the box portion 69 through the enlarged bore portion 75a, and the front end 33b of the wire 33 is positioned at an inner part 75c of the long groove portion 75b.

Support of the wire 33 by a hinge member 79 is ensured in the same manner as that of the wire 41 by the hinge member 43 as shown in FIG. 2. That is, the hinge member 79 includes a pillar side hinge 79a and a door side hinge 79b which are connected by a hinge pin 81 having two divided portions. A cover member 85 of the wire 33 is engaged with an engagement portion 83 of the hinge member 79, and positioned by a resilient member 87. The cover member 85 is formed with tapers 85a, 85b.

FIG. 7 is a schematic section illustrating the wire 41 coupled in the portion C as shown in FIG. 1. A rear end 41b of the wire 41 is connected to the rear pillar 21 through a coupling member 89. In the same manner as the coupling member 67 as shown in FIG. 6, the coupling member 89 comprises a box portion 91 and a leg portion 93. The leg portion 93 is fixed to the rear pillar 21 by a bolt and nut 95. The box portion 91 is formed with a groove 97 having an enlarged bore portion 97a formed in a side wall 91a on the outer side as viewed in the cross direction of the vehicle body, and a long groove portion 97b formed in a side wall 91b on the front side as viewed in the longitudinal direction of the vehicle body. Arranged at the rear end 41b of the wire 41 is a fourth head 99 which is inserted into the box portion 91 through the enlarged bore portion 91a, and the rear end 41b of the wire 41 is positioned at an inner part 97c of the long groove portion 97b. Support of the wire 41 is carried out by simply putting the wire 41 through a rear end 3b of the rear door 3 which serves as a support part.

Coupling of the wire 39 in the portion C as shown in FIG. 1 is of the integral type, i.e., an end of the wire 39 is entangled with the wire 41. Alternatively, coupling of the wire 39 may be carried out with the end of the wire 39 constructed in the same manner as the end 41b of the wire 41, and an enlarged bore portion and a long groove portion of the coupling member 89 formed for exclusive use of the wire FIG. 8 is a schematic section illustrating the wire 31 coupled in the portion D as shown in FIG. 1. The wire 31 is connected to the side sill 23 through a coupling member 101. The coupling member 101 is constructed in the same manner as the coupling members 67, 89 as shown in FIGS. 6 and 7, and comprises a box portion 103 and a leg portion 105. The leg portion 105 is fixed to the side sill 23 by a bolt and nut 107. The box portion 103 is formed with a groove 109 having an enlarged bore portion 109a formed in a side wall 103a on the inner side as viewed in the cross direction of the vehicle body, and a long groove portion 109b formed in a side wall 103b on the upper side of the vehicle body. Arranged at a lower end 31a of the wire 31 is a fifth head 111 which is inserted into the box portion 103 through the enlarged bore portion 109a, and the lower end 31a of the wire 31 is positioned at an inner part 109c of the long groove portion 109b. Support of the lower end 31a of the wire 31 is carried out by simply putting the wire 31 through a lower part 1d of the front door 1 which serves as a support part. Fixing of the wire 35 may be carried out by entangling an end thereof with the wire 31, or with a groove for exclusive use of the wire 35 formed in the coupling member 101.

Next, operation of this embodiment will be described.

First, a description will be made with regard to the case that an inward load as viewed in the cross direction of the vehicle body is input, for example, to the front door 1 due to side collision.

If the load input is smaller, it is absorbed by the rigidity of the front door 1 itself.

If the load input is greater, the front door 1 is deformed so that the wires 31, 33, 35 have tensions produced, respectively. Referring to FIG. 1, tensions are transmitted to the center pillar 28, the wires 87, 41, etc. in the portions A, A', to the front pillar 17 in the portions B. B', and to the side sill 23 in the portion D. Tension transmitted to the wire 37 is in turn transmitted to the side sill 23 in the portion D', whereas tension transmitted to the wire 41 is in turn transmitted to the rear pillar 21 in the portion C.

Upon transmission of tensions, in the embodiments of the present invention in particular, the center pillar 28 receives only constituents of tensions of the wires operating in the cross direction of the vehicle body and in the vertical direction, and not constituents operating in the direction of extending thereof.

Figure 9A:
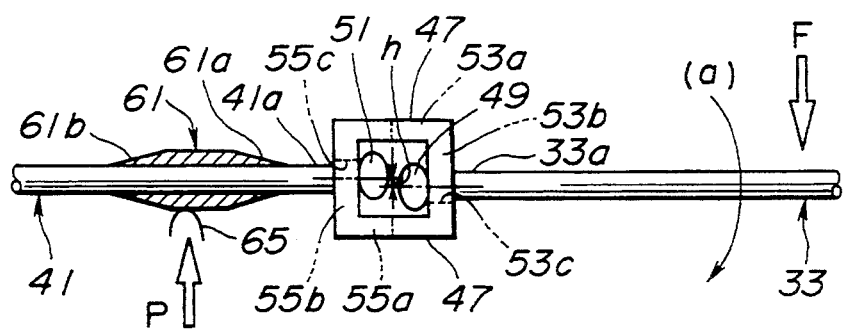
FIGS. 9a to 9c are diagrammatic views for explaining transmission of tensions of wires.
Figure 9B:
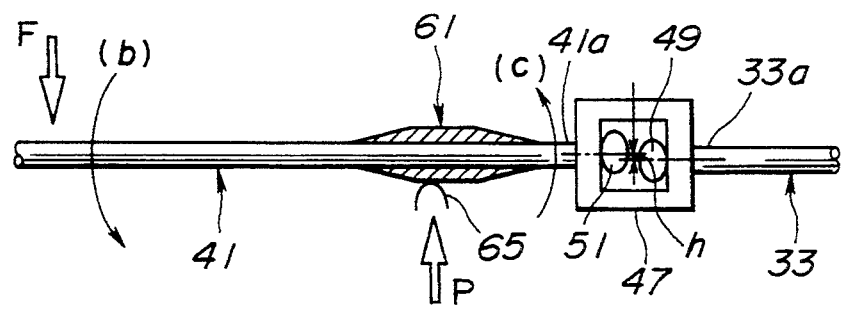
Figure 9C:
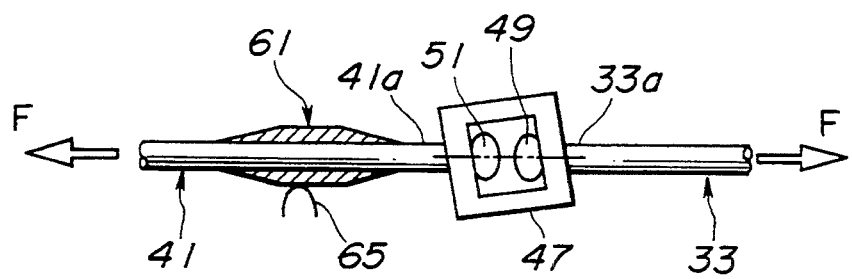

Referring to FIGS. 9a to 9c, a further description will be made with regard to this. In the portion A as shown in FIG. 1, the constituents of tensions of the wires 33, 41 operating in the direction of extending thereof are not transmitted to the center pillar 28. That is, referring to FIG. 2, the wire 41 is simply positioned to the engagement portion 57 of the hinge member 43 by the resilient member 63 as shown in FIG. 4, so that if the wire 33, 41 have tensions produced in the axial direction or direction of extending thereof, the wire 41 can relatively be moved in the direction of extending thereof and toward the hinge member 43. As shown in FIG. 9c, at that moment, the coupling member 47 is rotated due to the positional difference "h" between the wires 33, 41, so that coupling of the wires 33, 41 with the coupling member 47 can be reinforced. Therefore, transmission of tensions is carried out between the wires 33, 41 in the direction of extending thereof through the coupling member 47. Tensions are transmitted to the front pillar 17 and the rear pillar 21 through the wires 33, 41, enabling powerful support as will be described later. Thus, since the center pillar 28 fails to directly receive tensions of the wires 33, 41 operating in the direction of extending thereof, it is released from a mission of supporting tensions of the wires 33, 41 operating in the direction of extending thereof.

Additionally, in the portion A as shown in FIG. 1, the constituents of tensions of the wires 33, operating in the cross direction of the vehicle body are transmitted to the center pillar 28 through the hinge member 43, enabling support of the constituents of tensions operating in the cross direction of the vehicle body. That is, if the front door 1 undergoes a load F from the outer side as viewed in the direction of the vehicle body as shown in FIG. 9a, the wire 33 is deformed inward as viewed in the direction of the vehicle body as indicated by an arrow (a) in FIG. 9a. At that moment, since the hinge cap 65 with a reaction force P supports the cover member 61 of the wire 41, the wire 33 is deformed on the hinge cap 65 as a fulcrum. Therefore, the constituents of tensions of the wires 33, 41 operating in the cross direction of the vehicle body are transmitted to the center pillar 28 through the hinge cap 65 and the pillar side hinge 43a. In that case, the rear end 33a of the wire 33 is pressed more firmly on the inner part 53c of the Long groove portion 53b of the coupling member 47, whereas the front end 41a of the wire 41 is also pressed more firmly on the inner part 55c of the long groove portion 55b of the coupling member 47. Thus, the wires 33, 41 are connected more firmly to the coupling member 47, achieving sure transmission of tensions.

Additionally, in the portion A as shown in FIG. 1, the constituents of tensions of the wires 33, 41 operating in the vertical direction are transmitted to the center pillar 28 through the hinge member 43 as shown in FIG. 2, enabling support of the constituents of tensions operating in the vertical direction. That is, the cover member 61 of the wire 41 is pressed on the recess 57b of the door side hinge 43b and the hinge pin 45 by the constituents of tensions of the wires 33, 41 operating in the vertical direction, which is transmitted to the center pillar 28 through the door side hinge 43b and the pillar side hinge 43a.

If an inward load as viewed in the cross direction of the vehicle body is input to the rear door 3 as shown in FIG. 1, which is smaller, it is absorbed by the rigidity of the rear door 3 itself in the same manner as the front door 1.

If the load input is greater, the rear door 3 is deformed so that the wires 37, 41, 39 have tensions produced, respectively. Referring to FIG. 1, tensions are transmitted to the center pillar 28 and the wires 33, 35 in the portions A, A', to the front pillar 17 in the portions B. B', and to the side sill 23 in the portion D. Additionally, tension of the wire 37 is transmitted to the side sill 23 and the wire 39 in the portion D', whereas tensions of the wires 39, 41 are transmitted to the rear pillar 21 in the portion C.

In that case, the constituents of tensions of the wires 33, 41 operating in the direction of extending thereof are transmitted to the front pillar 17 and the rear pillar 21 in the same manner as described above.

Additionally, the constituents of tensions of the wires 33, 41 operating in the cross direction of the vehicle body are transmitted to the center pillar 28 through the hinge member 43 in the same manner as described above. In that case, the wire 41 is deformed inward as viewed in the cross direction of the vehicle body as indicated by an arrow (b) in FIG. 9b by a load F to the rear door 3. At that moment, the hinge cap 65 with a reaction force P serves as a fulcrum, so that the front end 41a of the wire 41 is deformed outward as viewed in the cross direction of the vehicle body as indicated by an arrow (c) in FIG. 9b. Therefore, the constituents of tensions of the wires 33, 41 operating in the cross direction of the vehicle body can be transmitted to the center pillar 28 in the same manner as described above, increasing a coupling strength of the wires 33, 41 with the coupling member 47, resulting in achievement of sure transmission of tensions.

The constituents of tensions of the wires 33, 41 operating in the vertical direction due to the load input of the rear door 3 are transmitted to the center pillar 28 through the hinge member 43 in the same manner as the front door 1.

Due to such transmission, the constituents of tensions of the wires 33, 41 operating in the direction of extending thereof are supported by the front pillar 17 and the rear pillar 21, whereas the constituents thereof operating in the cross direction of the vehicle body and in the vertical direction are supported by the center pillar 28. That is, the constituents of tensions operating in the above directions are supported dispersedly, enabling full support of tensions without any particular increase in size of the center pillar 28 and the hinge member 43 for carrying out transmission of tensions thereto. As a result, a weight increase of the vehicle body can be restrained, enabling arrangement of the increased number of wires.

It is to be noted that transmission of tensions in the portion A' as shown in FIG. 1 is substantially the same as described above, i.e., dispersed support of the constituents of tensions is possible.

Transmission of tension to the front pillar 17 is carried out as shown in FIG. 6. That is, since support of the wire 33 to the hinge member 79 at the front pillar 17 is the same as that of the wire 41 to the hinge member 43 at the center pillar 28, tension of the wire 33 operating in the direction of extending thereof is transmitted to the coupling member 67, which is in turn transmitted to the front pillar 27 through this coupling member 67. The constituents of tension of the wine 33 operating in the cross direction of the vehicle body and in the vertical direction are transmitted to the front pillar 17 through the hinge member 79 in the same manner as described above.

Transmission of tension to the rear pillar 21 is carried out as shown in FIG. 7. Tension of the wire 41 is transmitted to the rear pillar 21 through the coupling member 89 in the same manner as described above.

Transmission of tension to the side sill 23 is carried out as shown in FIG. 8. Tension of the wire 31 is transmitted to the side sill 23 through the coupling member 101.

Therefore, tensions of the wires which are firmly supported by the front pillar 17, center pillar 28, side sill 23, and rear pillar 21 as vehicle body frame members enable absorption of collision energy, and thus substantial restraint of deformation of the front door 1.

Figure 10:
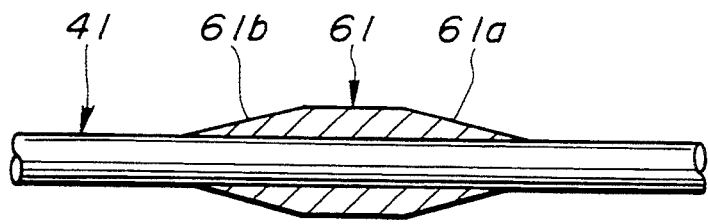
FIGS. 10a to 10d are views similar to FIG. 9c, for explaining a function of a cover member.
Figure 10:
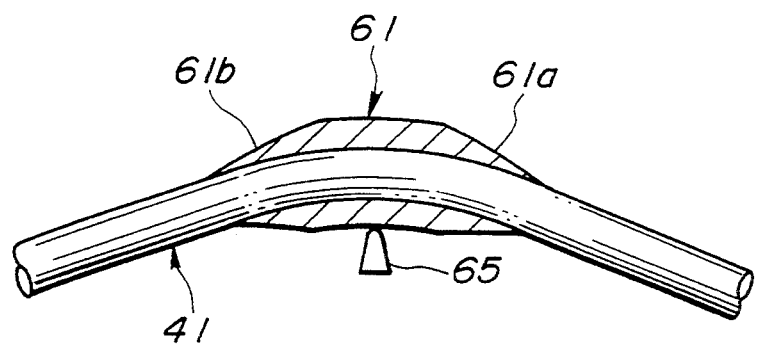
Figure 10:
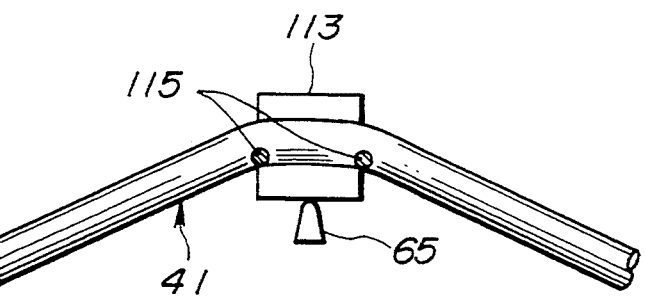
Figure 10:
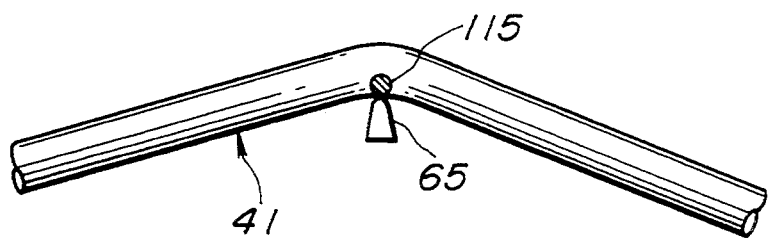

Referring to FIGS. 10a to 10d, a function of the cover member 61 will be described. When transmitting the constituent of tension of the wire 41 operating in the cross direction of the vehicle body to the hinge member 43, the cover member 61 serves to protect the wire 41. The cover member 61 is constructed to have easily deformable end portions due to arrangement of the tapers 61a, 61b, so that when undergoing a load, the cover member 61 operates to alleviate deformation of the wire 41, restraining occurrence of local strain. Specifically, when the wire 41 is deformed from a state as shown in FIG. 10a to a state as shown in FIG. 10b, the end portions of the cover member 61 can be deformed along the wire 41 due to arrangement of the tapers 61a, 61b, obtaining restraint of local strain.

FIG. 10c shows a case using a cover member 113 without any taper. Since both ends of the cover member 113 have local strain 115 produced, the strength of the wire 41 should be increased. FIG. 10d shows a case without cover member. In this case also. since local strain 115 is produced, the strength of the wire 41 should be increased. Thus, in either case, a weight increase cannot be avoided. On the other hand, in a case using the cover member 61 with the tapers 61a, 61b as shown in FIGS. 10a and 10b, the strength of the wire 41 can be decreased due to no occurrence of local strain, resulting in a weight reduction.

In the portion A as shown in FIG. 1, upon opening/closing of the front door 1, the front end 41a of the wire 41 interrupts coupling with the coupling member 47. Specifically, referring to FIGS. 2 and 3, when opening the Front door 1, the coupling member 47 is moved therewith, so that the Front end 41a of the wire 41 is relatively moved in the long groove portion 55b of the coupling member 47, disengaging the second head 51 of the wire 41 from the enlarged bore portion 55a of the coupling member 47. On the other hand, when closing the front door 1, the second head 51 of the wire 41 is entered from the enlarged bore portion 55a of the coupling member 47, so that front end 41a of the wire 41 is moved in the long groove portion 55b, and positioned at the inner part 55c. In this state, the positional difference "h" in the cross direction of the vehicle body exists between the wire 33 on the side of the front door 1 and the wire 41 on the side of the rear door 3.

In the portion B as shown in FIG. 1, upon opening/closing of the front door 1, the front end 33b of the wire 33 interrupts coupling with the coupling member 67 as shown in FIG. 6. This interruption of coupling of the front end 33b of the wire 33 with the coupling member 67 is the same as that of coupling of the front end 41a of the wire 41 with the coupling member 47, and is carried out through the enlarged bore portion 75a and tile long bore portion 75b of the coupling member 67.

In the portion C as shown in FIG. 1, the rear end 41b of the wire 41 interrupts coupling with the coupling member 89 as shown in FIG. 7. This interruption of coupling is the same as shown in FIG. 6, and carried out through the enlarged bore portion 97a and the long groove portion 97b of the coupling member 89.

In the portion D as shown in FIG. 1, the lower end 31a of the wire 31 interrupts coupling with the coupling member 101 as shown in FIG. 8. This interruption of coupling is the same as shown in FIGS. 6 and 7, and carried out through the enlarged bore portion 109a and the long groove portion 109b of the coupling member 101. Additionally, in the portions A', B' as shown in FIG. 1, coupling is interrupted in the same manner as the portions A, B, respectively.

Figure 11:
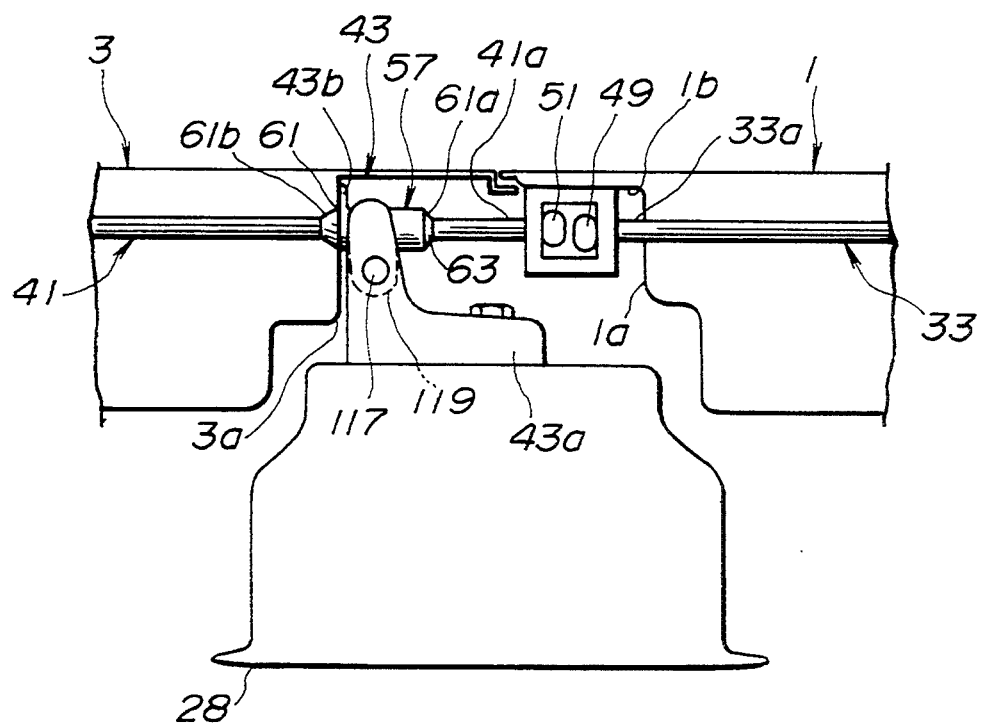
FIG. 11 is a view similar to FIG. 8, showing a variant of the first preferred embodiment.
Figure 12:
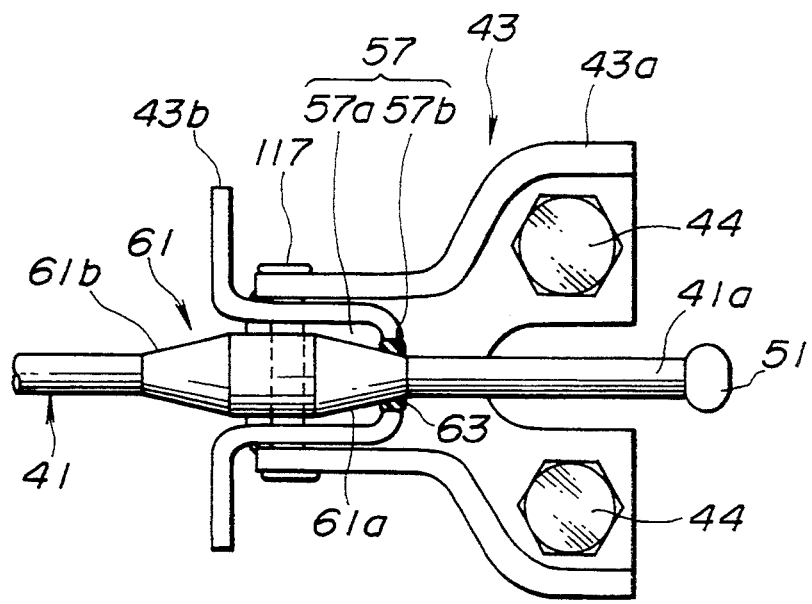
FIG. 12 is a view similar to FIG. 4, showing the variant.
Figure 13:
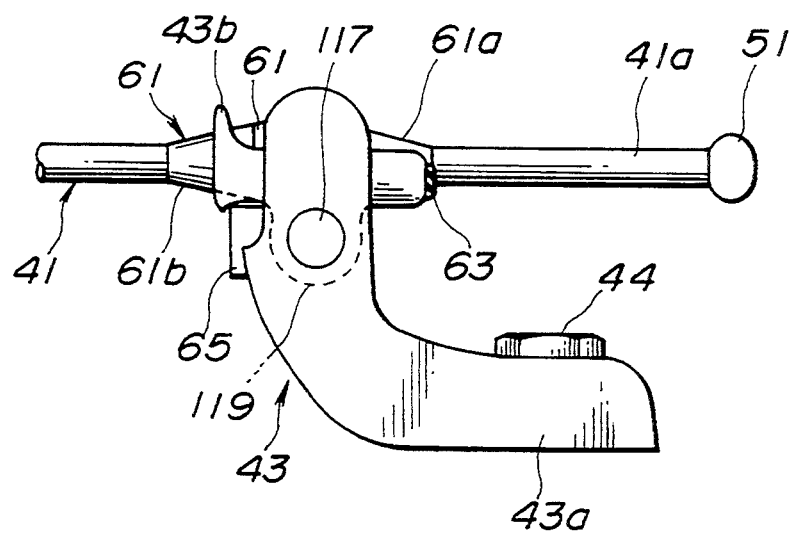
FIG. 13 is a view similar to FIG. 5, showing the variant.

Referring to FIGS. 11 to 13, there are shown variants of the first preferred embodiment, respectively. It is to be noted that FIG. 11 corresponds to FIG. 2, FIG. 12 corresponds to FIG. 4, and FIG. 14 corresponds to FIG. 5. The structure of the variants is fundamentally the same as that of the first preferred embodiment.

In these variants, a hinge pin 117 is not of the divided type, but of the type of vertically disposing through the pillar side hinge 43a and the door side hinge 43b. Thus, tile hinge pin 117 is arranged in a position apart from the cover member 61 of the wire 41, and the door side hinge 43b is provided with a bracket portion 119 for connection with the hinge pin 117. Therefore, the variants produce the same effect as that of the first preferred embodiment, and are applicable to other parts than the through type hinge pin 117.

Figure 14:
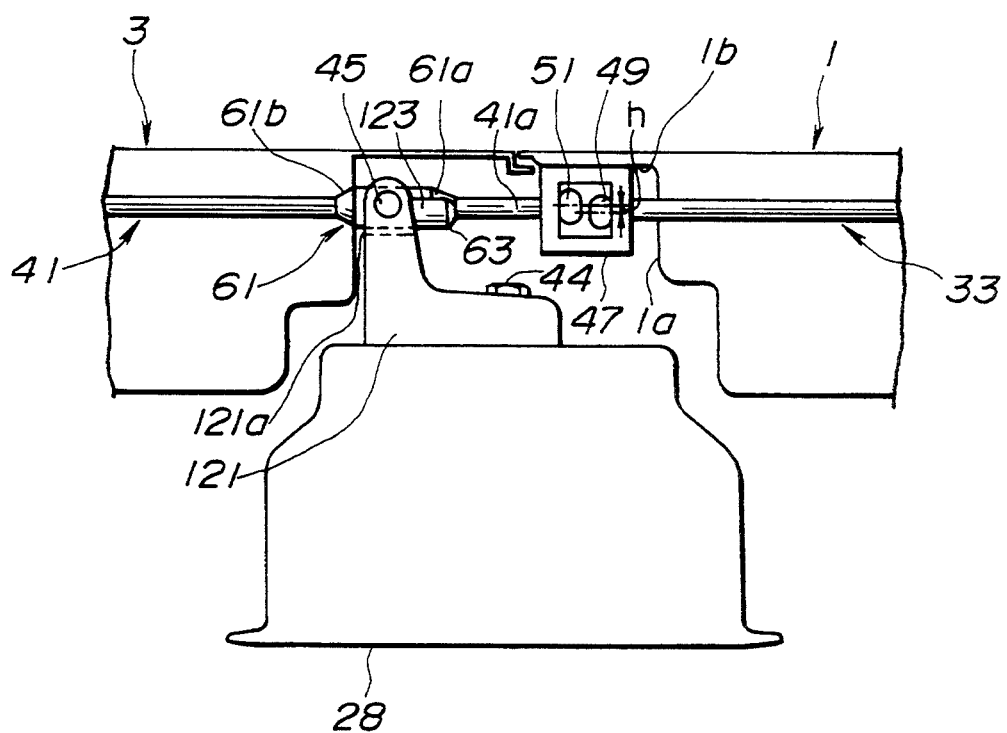
FIG. 14 is a view similar to FIG. 11, illustrating a second preferred embodiment of the present invention.
Figure 15:
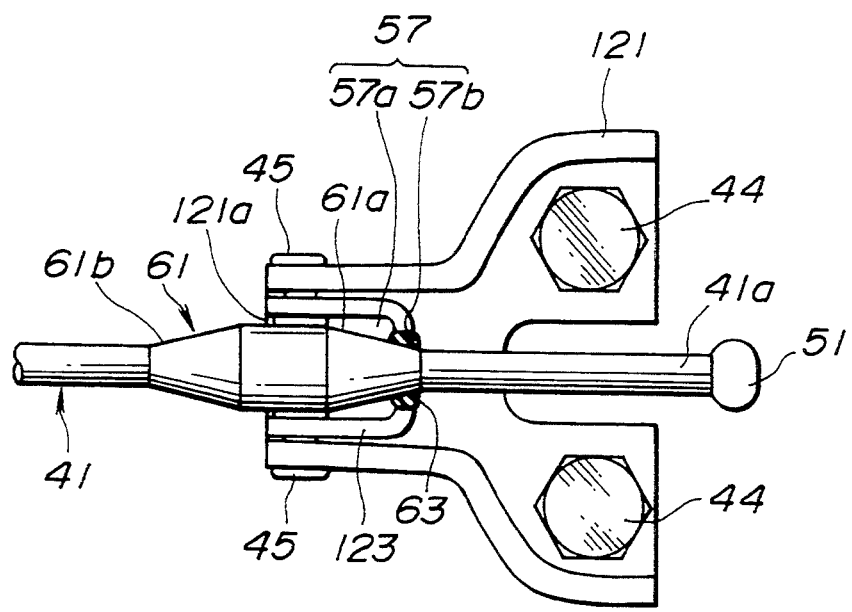
FIG. 15 is a view similar to FIG. 12, showing a support bracket.
Figure 16:
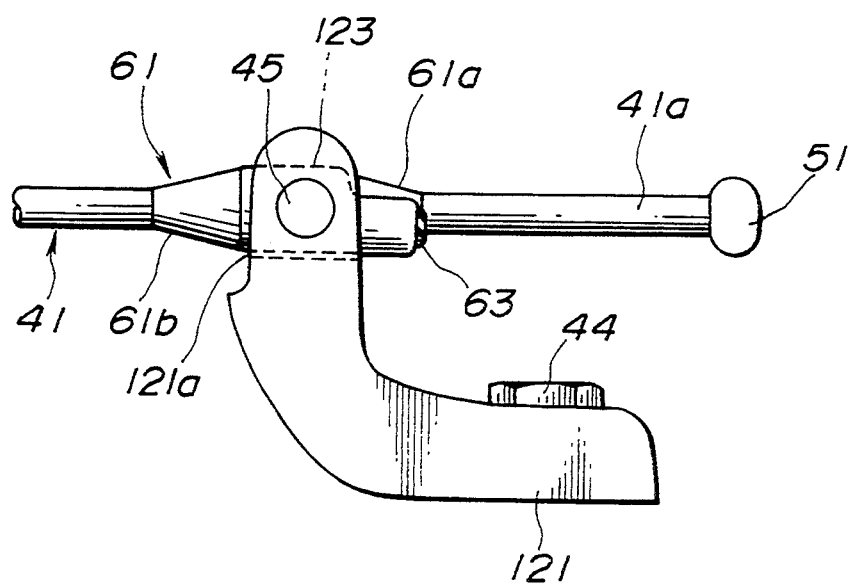
FIG. 16 is a view similar to FIG. 13, showing the support bracket.

Referring to FIGS. 14 to 16, there is shown a second preferred embodiment of the present invention. It is to be noted that FIG. 14 corresponds to FIG. 2, FIG. 15 corresponds to FIG. 4, and FIG. 16 corresponds to FIG. 5.

This embodiment shows the case that the wires are arranged in other portions than the portions A, A' as shown in FIG. 1. The engagement portion 57 as a support part is not arranged to the hinge member, but a support bracket 121 which is disposed to the center pillar 28 separately. This embodiment differs from the first preferred embodiment in that a rotational support portion 123 disposed to the support bracket 121 is used in place of the door side hinge 43b, and a working portion 121a disposed to the support bracket 121 is used in place of the hinge cap 65. The working portion 121a serves to support upon deformation of the wire 41 the cover member 61 with a reaction force. Therefore, this embodiment produces the same effect as that of the first preferred embodiment, and is applicable to other parts than the part having the hinge member disposed.

Figure 17:
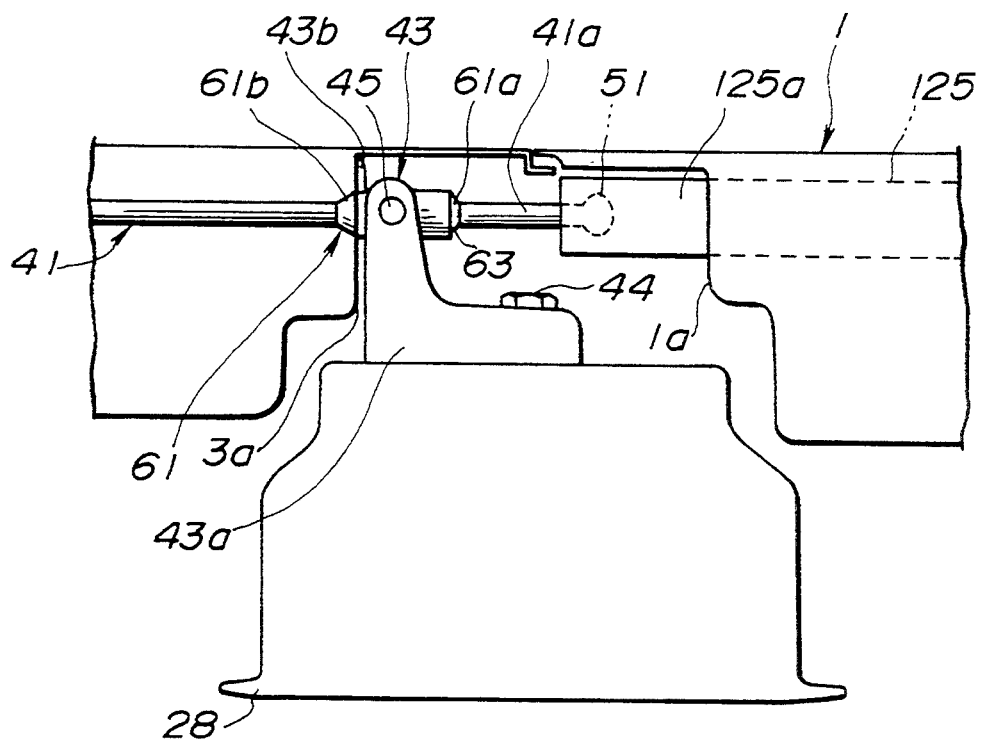
FIG. 17 is a view similar to FIG. 14, illustrating a third preferred embodiment of the present invention.
Figure 18:
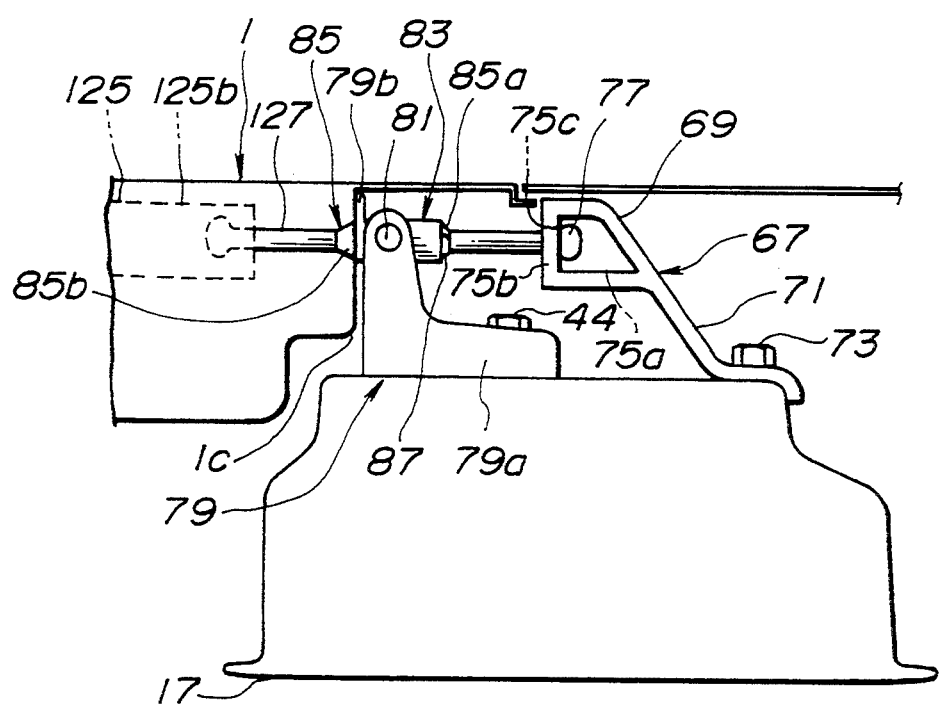
FIG. 18 is a view similar to FIG. 17, showing a structure corresponding to FIG. 6.

Referring to FIGS. 17 and 18, there is shown a third preferred embodiment of the present invention. It is to be noted that FIG. 17 corresponds to FIG. 2, and FIG. 18 corresponds to FIG. 6. In this embodiment, in place of the wire 33 of the front door 1, a guard bar 125 is disposed, which constitutes a coupling part. Thus, a coupling structure of a rear end 125a of the guard bar 125 with the front end 41a of the wire 41 is identical to that of the front end 41a of the wire 41 with the coupling member 47 of first preferred embodiment as shown in FIG. 2. Additionally, as shown in FIG. 18, a front end 125b the guard bar 125 is connected to a short wire 127 in the front door 1. The relationship between the short wire 127 and the hinge member 79 and coupling member 67 is the same as that between the corresponding parts in the first preferred embodiment. Therefore, this embodiment produces the same effect as that first preferred embodiment, and enables at the front door 1 energy absorption by deformation of the guard bar 125 itself.

Figure 19:
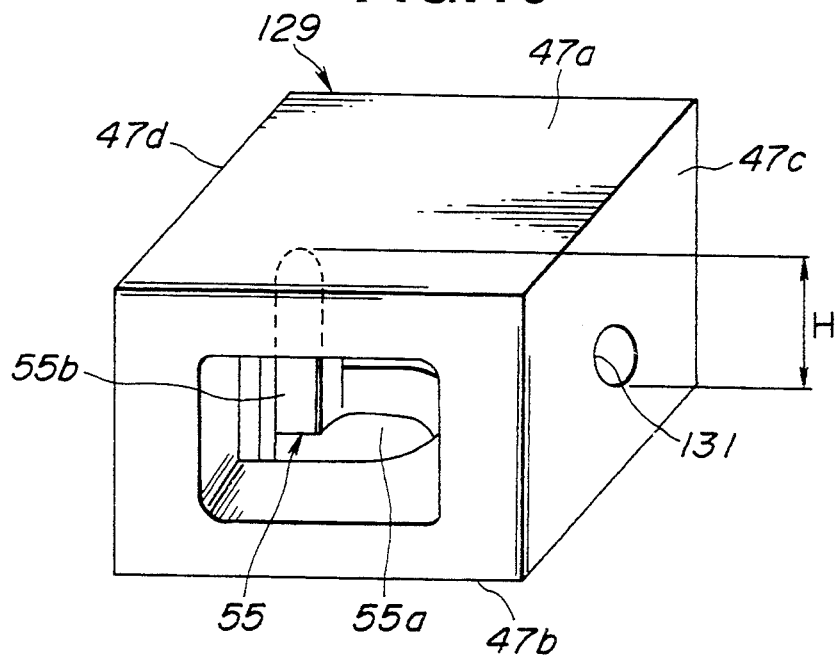
FIG. 19 is a view similar to FIG. 3, showing a variant of the coupling member.

Referring to FIG. 19, there is shown a variant of the coupling member used in the first preferred embodiment. In this variant, in view of no need of receiving and releasing operation upon opening/closing of the front door 1, coupling of the wire 33 on the side of the front door 1 is carried out through a bore 131 in place of the groove 53. A head is not arranged at the rear end 33a of the wire 33. After inserted into the bore 131, the wire 33 is fixed to the coupling member 129 by welding or the like. Therefore, this variant produces the same effect as that of the first preferred embodiment, and allows a simple structure of the coupling member 129.

Figure 20:
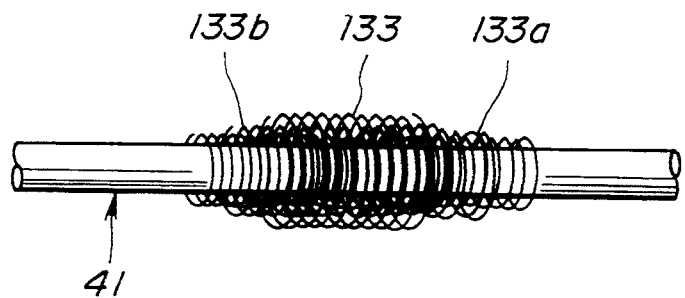
FIG. 20 is a view similar to FIG. 19, showing a variant of the cover member.

Referring to FIG. 20, there is shown a variant of the cover member 61 used in the first preferred embodiment. This cover member 133 is constructed by putting a finer wire than the wire 41 round the latter to have tapers 133a, 133b at both ends thereof. Therefore, this variant produces substantially the same effect as that of the cover member 61 of the first preferred embodiment, and enables the wire 41 to be more deformable.

Figure 21:
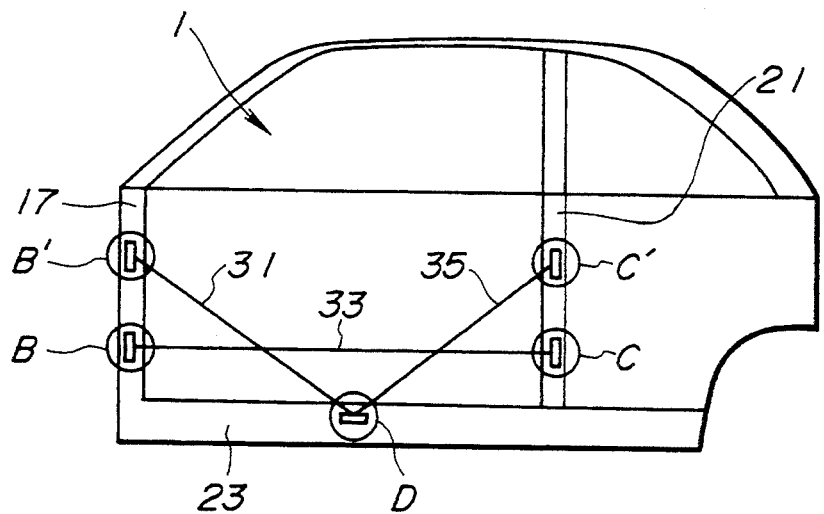
FIG. 21 is a view similar to FIG. 1, showing a vehicle body construction of a two-door motor vehicle to which the present invention is applied.

FIG. 21 shows another realization form of the present invention in connection with a two-door motor vehicle. In this case, coupling of the wires 31, 33, 35 is carried out in the portions B, B', D, C, C' as shown in FIG. 21. These portions have the same coupling structure as the corresponding ones as shown in FIG. 1, i.e., the portions B, B' are such as shown in FIG. 6, the portions C, C' are such as shown FIG. 7, and the portion D is such as shown in FIG. 8. Therefore, this realization Form enables transmission of tensions of the wires to the front pillar 17, rear pillar 21, side sill 23, etc., and thus produces the same effect as that of the first preferred embodiment.

Figure 22:
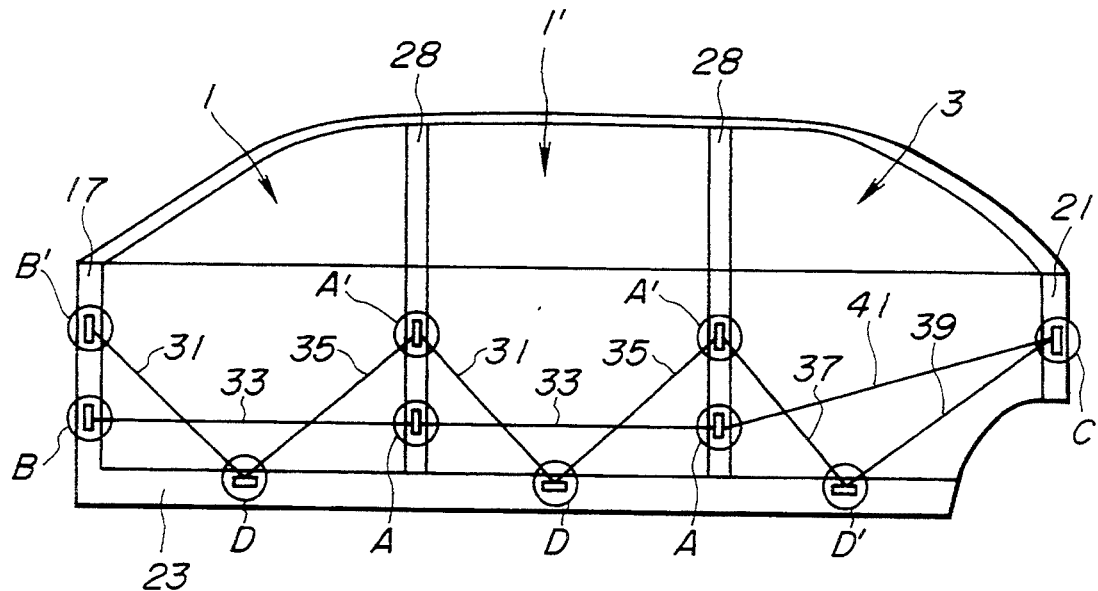
FIG. 22 is a view similar to FIG. 21, showing a three-door motor vehicle to which the present invention is applied.

FIG. 22 shows the other realization form of the present invention in connection with a motor vehicle having three or more doors on one side thereof. This motor vehicle provides a center door 1' in addition to the front door 1 and the rear door 3. The wires 31, 35, 37, 39, 41 are connected to the front pillar 17, rear pillar 21, side sill 23, and center pillar 28, respectively, in the portions A, A', B, B', C, D, D'. These portions have the same coupling structure as the corresponding ones as shown in FIG. 1. Therefore, this realization form enables transmission of tensions of the wires to the front pillar 17, rear pillar 21, side sill 23, center pillar 28, etc., and thus produces the same effect as that of the first preferred embodiment, and achieves energy absorption and restraint of deformation of the door even with the three or more doors arranged.

In this realization form, the long flexible member is a wire. Alternatively, it may be the other member which allows reinforcement of the door by tension such as a cord-like member made of resin, a chain-plate-like piece as continuously connected, or the like.

Figure 23:
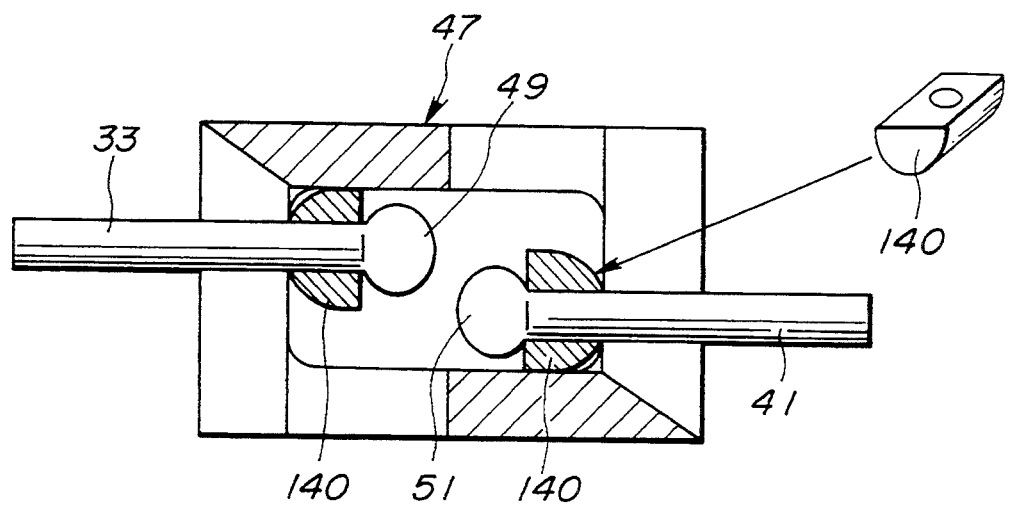
FIG. 23 is an enlarged sectional view showing another variant of the coupling member.
Figure 24:
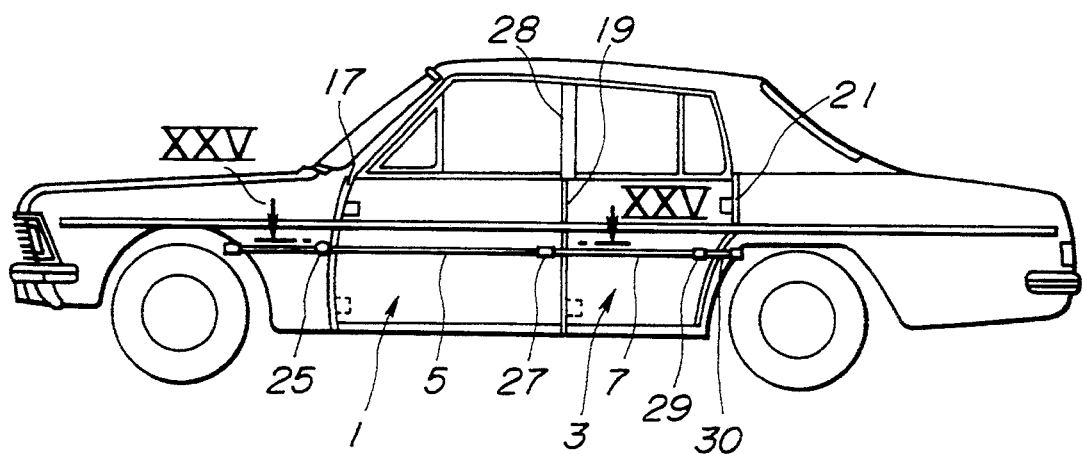
FIG. 24 is a view similar to FIG. 15, showing a vehicle body construction of a known motor vehicle.
Figure 25:
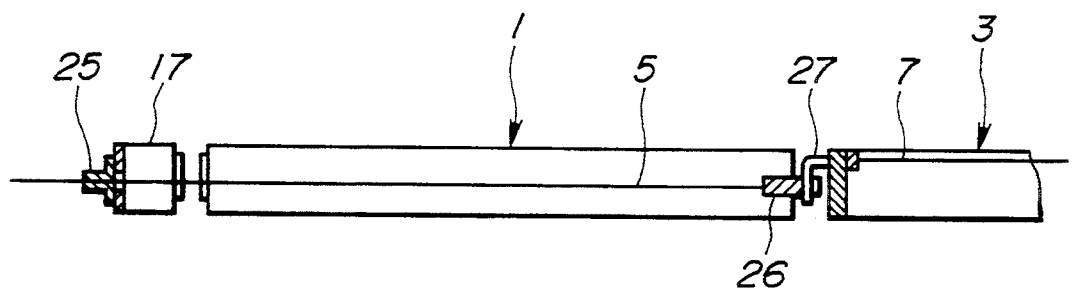
FIG. 25 is a view similar to FIG. 18, taken along the line XXV—XXV of FIG. 24.

Referring to FIG. 23, there is shown a variant the heads 49, 51 arranged to the wires 33, 41 at the ends thereof. As shown in FIG. 23, the heads 49, 51 are supported through semicylindrical members 140, respectively. If the wire 33, 41 is pulled with a certain angle upon collision of the motor vehicle, the heads 49, 51 can be displaced in the corresponding direction, avoiding the wire 33. 41 undergoing a unnatural force.

The head of this type is useful since the wire on the rear side is pulled diagonally in particular.

Having described the present invention in connection with the preferred embodiments, it is to noted that the present invention is not limited thereto, and various changes and modifications are possible without departing from the spirit of the present invention.

What is claimed is:

1. A vehicle body construction for a motor vehicle having a longitudinal direction, comprising:
   a body frame including a front pillar, a rear pillar, a center pillar disposed forwardly of said rear pillar and rearwardly of said front pillar with respect to the longitudinal direction of the motor vehicle, said body frame also including a side sill between said front, center and rear pillars;
   a front door hingedly connected to said front pillar;
   a rear door hingedly connected to said center pillar;
   a first coupling member fixed to said front door at a portion which comes adjacent to said center pillar when said front door is closed;
   a second coupling member fixed to said front pillar;
   a third coupling member fixed to said rear pillar;
   said front door having a first member which has one end portion fixedly coupled with said first coupling member and an opposite end portion;
   said rear door having a second member which has one end portion mating with said third coupling member for coupling therewith during closing of said rear door with said front door closed, and an opposite end portion;
   means for supporting said first member on said front pillar for allowing limited movement of said first member in a direction toward said second coupling member and for movement with said front door such that the opposite end portion of said first member is coupled with said second coupling member during closing of said front door;

means for supporting said second member on said center pillar for allowing limited movement of said second member in a direction toward said first coupling member and for movement with said rear door such that the opposite end portion of said second member is coupled with said first coupling member during closing of said rear door with said front door closed.

2. A vehicle body construction is claimed in claim 1 wherein:

said first member includes a guard bar.

3. A vehicle body construction as claimed in claim 2, wherein:

said first member is in the form of a wire and has a first head on said one end portion thereof, said second member is in the form of a wire and has a second head on said the opposite end portion of said second member, and said first coupling member includes first bore means for receiving said first head and second bore means for receiving said second head.

4. A vehicle body construction as claimed in claim 3, wherein:

said first coupling member includes first groove means for receiving said one end portion of said first member and second groove means for receiving said the opposite end portion of said second member.

5. A vehicle body construction as claimed in claim 4, wherein:

said one end portion of said first member and said the opposite end portion of said second member are out of alignment with each other such that when said first and second member are pulled away from said first first coupling member, said first coupling member is subject to a torque.

6. A vehicle body construction as claimed in claim 5, wherein:

said first and second groove means are operative to allow inclination of said coupling member in a direction to increase engagement of said one end portion of said first member and said the opposite end portion of said second member with said first and second groove means when said first coupling member is subject to said torque.

7. A vehicle body construction as claimed in claim 1, wherein:

said second member supporting means includes a support bracket on said center pillar, a rotational support portion, hinge pin means for rotatably supporting said rotational support portion on said support bracket, and means for holding said second member on said rotational support portion.

8. A vehicle body construction as claimed in claim 7, wherein said holding means include a cover member on said wire of said second member and a resilient member on said rotational support portion cooperating with said cover member.

9. A vehicle body construction as claimed in claim 8, wherein said cover member is in the form of a sleeve having both ends tapered.

10. A vehicle body construction as claimed in claim 1, wherein said second member supporting means include a center pillar side hinge fixedly secured to said center pillar, a rear door side hinge fixedly secured to said rear door, hinge pin means for rotatably supporting said rear door side hinge on said center pillar side hinge, and means for holding said second member on said rear door side hinge.

11. A vehicle body construction as claimed in claim 10, wherein said holding means include a cover member on said wire of said second member and a resilient member on said rear door side hinge cooperating with said cover member.

12. A vehicle body construction as claimed in claim 11, wherein said cover member is in the form of a sleeve having both ends tapered.

13. A vehicle body construction as claimed in claim 1, wherein said first member support means include a front pillar side hinge fixedly secured to said front pillar, a front door side hinge fixedly secured to said front door, hinge pin means for rotatably supporting said front door side hinge on said front pillar side hinge, and means for holding said first member on said front door side hinge.

14. A vehicle body construction as claimed in claim 1, further comprising:

a fourth coupling member fixed to said front door at a portion which comes adjacent to center pillar when said front door is closed;

a fifth coupling member fixed to said front pillar;

a sixth coupling member fixed to said sill at a portion between said front and center pillars; and a seventh coupling member fixed to said sill at a portion between said center and rear pillar;

wherein said front door has a third member which has one end portion mating with said sixth coupling member for coupling therewith during closing of said front door and the opposite end portion mating with said fifth coupling member for coupling therewith during closing of said front door, and has also a fourth member which has one end portion fixedly coupled with said fourth coupling member and the opposite end portion integral with said opposite end portion of said third member;

and wherein said rear door has a fifth member which has one end portion mating with said seventh coupling member for coupling therewith during closing of said rear door and the opposite end portion mating with said fourth coupling member for coupling therewith during closing of said rear door with said front door closed, and has also a sixth member which has one end portion integral with said one end portion of said second member and the opposite end portion integral with said one end portion of said fifth member.

15. A vehicle body construction as claimed in claim 14, wherein each of said first, second, third, fourth, fifth and sixth members is in the form of a wire.

16. A vehicle body construction as claimed in claim 15, further comprising:

means for supporting said third member on said front pillar for allowing limited movement of said third member in a direction toward said fifth coupling member and for movement with said front door such that the opposite end portion of said third member is coupled with said fifth coupling member during closing of said front door; and means for supporting said fifth member on said center pillar for allowing limited movement of said fifth member in a direction toward said fourth coupling member and for movement with said rear door such that the opposite end portion of said fifth member is coupled with said fourth coupling member during closing of said rear door with said front door closed.

* * * * *